No. 660,937. Patented Oct. 30, 1900.
B. C. STICKNEY.
TYPE WRITING MACHINE.
(Application filed Jan. 12, 1900.)

(No Model.) 5 Sheets—Sheet 1.

Fig. 1.

WITNESSES:
S. Nielsen
Ethel Wells

INVENTOR.
B. C. Stickney
by Jacob Felbel
His ATTORNEY

No. 660,937. Patented Oct. 30, 1900.
B. C. STICKNEY.
TYPE WRITING MACHINE.
(Application filed Jan. 12, 1900.)

(No Model.) 5 Sheets—Sheet 3.

WITNESSES:
INVENTOR
B. C. Stickney
by Jacob Felbel
HIS ATTORNEY

No. 660,937. Patented Oct. 30, 1900.
B. C. STICKNEY.
TYPE WRITING MACHINE.
(Application filed Jan. 12, 1900.)

(No Model.) 5 Sheets—Sheet 4.

WITNESSES: INVENTOR:
S. Nielsen B.C. Stickney
Ethel Wells by Jacob Felbel
HIS ATTORNEY No. 660,937. Patented Oct. 30, 1900.
B. C. STICKNEY.
TYPE WRITING MACHINE.
(Application filed Jan. 12, 1900.)
(No Model.) 5 Sheets—Sheet 5.

WITNESSES:
INVENTOR:
HIS ATTORNEY

UNITED STATES PATENT OFFICE.

BURNHAM C. STICKNEY, OF ELIZABETH, NEW JERSEY, ASSIGNOR TO JACOB FELBEL, OF NEW YORK, N. Y.

TYPE-WRITING MACHINE.

SPECIFICATION forming part of Letters Patent No. 660,937, dated October 30, 1900.

Application filed January 12, 1900. Serial No. 1,190. (No model.)

*To all whom it may concern:*

Be it known that I, BURNHAM C. STICKNEY, a citizen of the United States, and a resident of Elizabeth, in the county of Union and State of New Jersey, have invented certain new and useful Improvements in Type-Writing Machines, of which the following is a specification.

My invention relates to the type-bar-operating mechanism of type-writing machines.

In giving a key the usual quick or staccato blow the finger of the operator receives two shocks, the first due to the inertia of the type-bar, which offers resistance to being suddenly put in motion, and the second due to the sudden arrest of the operator's hand by reason of the contact of the type with the platen. Although each shock considered by itself is not serious, still after operating the machine a short time the operator suffers undue fatigue by reason of the constant repetition of these shocks. Heretofore it has been usual to provide fixed or unvarying pivots or fulcrums for the levers which operate the type-bars, so that the leverage or purchase at the finger-key is substantially the same at all points in the excursion of the type to platen. Hence the resistance offered by the type-bar to being put suddenly in motion is very perceptible at the key, while, on the other hand, as the purchase at the key does not change during the key-stroke nothing is done toward checking or absorbing the momentum of the hand before the moment of impact of the type upon the platen.

The object of my invention is to minimize the shocks at both the beginning and finish of the key-stroke.

To this end the invention contemplates the use of means for automatically shifting the fulcrum-point of the type-bar-operating lever, so that the purchase or leverage at the finger-key at the beginning of the stroke is very great, and hence the movement of the type-bar during the first part of the key depression is slight, and the shock arising from inertia of the type-bar is therefore practically eliminated, and, further, so that the purchase of the key upon the type-bar is diminished during the entire key movement, whereby the type-bar is speeded as it nears the platen, while at the same time the opposition offered by the type-bar to an acceleration of its movement causes the key to offer a gradually-increasing resistance to the finger of the operator, so that the momentum of the hand is partially absorbed and the shock occurring at the impact of the type upon the platen is to a large extent forestalled and avoided.

My invention consists in means for causing the fulcrum-point of the type-bar-operating lever to shift during the operation of the lever, while the load-point remains constant, so that the purchase of said lever upon the type-bar diminishes during the operation of the lever.

The invention further consists in certain combinations or devices and features of constructions, all as will be more fully hereinafter described, and particularly set forth in the concluding claims.

In the accompanying drawings.

Throughout the several views the same part will be found designated by the same numeral of reference.

The framework consists of a rectangular base 1, corner-posts 2 rising therefrom, and a top plate 3 secured upon the posts and having at its forward portion a large opening 4 for the passage of the types in their movement to the platen. Each type-block 5 is provided with an upper and lower case type suitably secured upon the free forward end of a type-carrier 6. The type carriers or bars are pivoted at their rear ends upon a common fulcrum-rod 7, which is bowed or arc-shaped and seated in a curved slot 8, formed in a shiftable segment 9, the latter being guided in its vertical shift movements between vertical guides 10, depending from the under side of the top plate, to which they are secured by screws 11, bearing-balls 12 being interposed between the segment-casting and the guides 10 and both the guides and the segment being provided, of course, with suitable ballways. The segment is also provided with radial slots 13, one for each type-bar. The type ends of the bars rest normally upon a segmental pad 14, having a metallic support 15, the latter being secured to the forward ends of arms 16, which are fastened to the segment 9 by screws 17. Each type-bar is returned from working position to normal position and there retained by a radially-arranged helical draw-spring 18, which hooks at its forward end into a perforation 18$^a$, formed near the lower edge of a segmental plate 19 and at its rear end into a sheet-metal yoke or strap 20, which straddles the type-bar and is pivoted thereto at a point 21, near the pivot 7 thereof. The plate 19 is secured to the support 15 by screws 19$^a$. The segment 9 and its attachments constitute a shiftable supporting-frame for the type-bars. A short horizontal draw bar or link 22 is pivoted at its forward end 23 to the type-bar and at its rear end 24 to the upper end of a vertical arm 25 of a bell-crank lever, the latter being pivoted to a horizontally-extending unpivoted key-lever 27 of the second order at a point 26 between the ends of the latter. When the segment 9 is shifted, the forward ends of links 22 move up or down with the type-bars. The other arm 28 of the bell-crank lever or sublever extends downwardly and forwardly from the pivot 26 and at its lower end is forked at 29, so as to straddle a cylindrical fulcrum rod or bar 30, which extends horizontally across the machine beneath the key-levers and is suitably secured at 31 to the side walls of the base. It will be understood that the segment 9 may be provided with as many radial slots 13 as there are type-bars and that the latter lie horizontally at different heights, the arms 25 of the bell-crank levers being of correspondingly-different lengths.

At a point just forward of the bell-crank lever each key-lever is provided with a lifting-spring, as 32, the lower end of which hooks into a hole 33 in a key-lever and the upper end of which hooks into a perforation formed in a horizontal transverse bar 34, having upwardly-extending arms 36, which are secured, by means of screws 35, to the under side of the top plate. This spring causes the forward end of the key-lever to bear up normally against a pad 37, arranged upon the under side of a transverse bar 37$^a$, and its rear portion to bear up against the under side of a fixed plane horizontal fulcrum-plate 38. This fulcrum-plate is arranged over the rear ends of the key-levers and may be formed integrally with the horizontal rear plate 1$^a$ of the base, or it may be secured, by means of screws 38$^a$, to bosses 1$^b$ on said base-plate. The rear end portion of each key-lever is extended or prolonged, and the upper edge of the extension is curved at 39 to form a tread or rocker, which creeps or rolls along the under surface of the fulcrum-plate when the forward end of the key-lever is depressed, thus changing the leverage or purchase of the key upon the type-bar. It will be observed that the fulcrum is correspondingly extended or elongated, or, in other words, the plate 38 may be considered as made up of a series of elongated fulcrums, one for each key-lever, the elongation being of course in a direction parallel with the length of the key-lever. About midway of the rocker or "tread" portion each key-lever is provided at its upper edge with a notch 40, whereby it engages a horizontal transverse bar or projection 41, which is secured to the under side of the fulcrum-plate, preferably by means of ears 42, formed upon the bar and projecting up through holes in the plate, to which they are riveted at 43. Endwise movement of the key-levers is thus prevented. Formed integrally with the bar 41 is a guide-comb or series of teeth 44 for spacing the key-levers apart. Removably secured by means of screws 46 to depending integral arms 45 (one on each end of the bar 41) is a transverse guard-bar 47, which is arranged just beneath the lower edges of the key-levers, so as to permit a limited vertical movement of the latter, but to prevent accidental disengagement of the notches 40 from the bar 41. As usual, the key-levers at their forward portions are guided in their vertical movements by a comb 48, secured to the transverse bar 37$^a$.

The letter-spacing movements of the spring-propelled carriage may be effected in any suitable way, as by a transverse universal bar 49, depending, by means of rods 50, from arms 51, secured to a rocking frame 52, pivoted at 53 to a bracket 54, secured to the under side of the top plate 3. The said rocking frame also includes a vertical arm 55, at the upper end of which are carried both a pivoted feeding or stepping dog 56, which is normally in engagement with a carriage-rack 57, and a fixed detent-dog 58 in line with said dog 56. A cylindrical platen is indicated at 59. Inasmuch as the platen and paper-carriage are not directly related to my present invention, they are not fully illustrated and may be of any usual or suitable construction.

In operation the key-lever is depressed in the usual manner, carrying down the pivot 26 of the bell-crank lever and causing the arm 25 of the latter to swing rearwardly, so that by means of link 22 the type-bar is swung up to strike the platen. During this operation the universal bar 49 is carried down, the rocker-arm 55 is swung forwardly, and the dog 56 disengaged from the rack 57, the fixed dog 58 becoming engaged therewith. Upon release of the key from pressure the springs 18 and 32 cause the type-bar, key-lever, and sublever to return to normal position, and the usual dog-rocker spring (not shown) causes a return of the dog-rocker to normal position, permitting the carriage to advance one tooth in the usual manner under the tension of the carriage-spring. (Not shown.)

Figure 1:
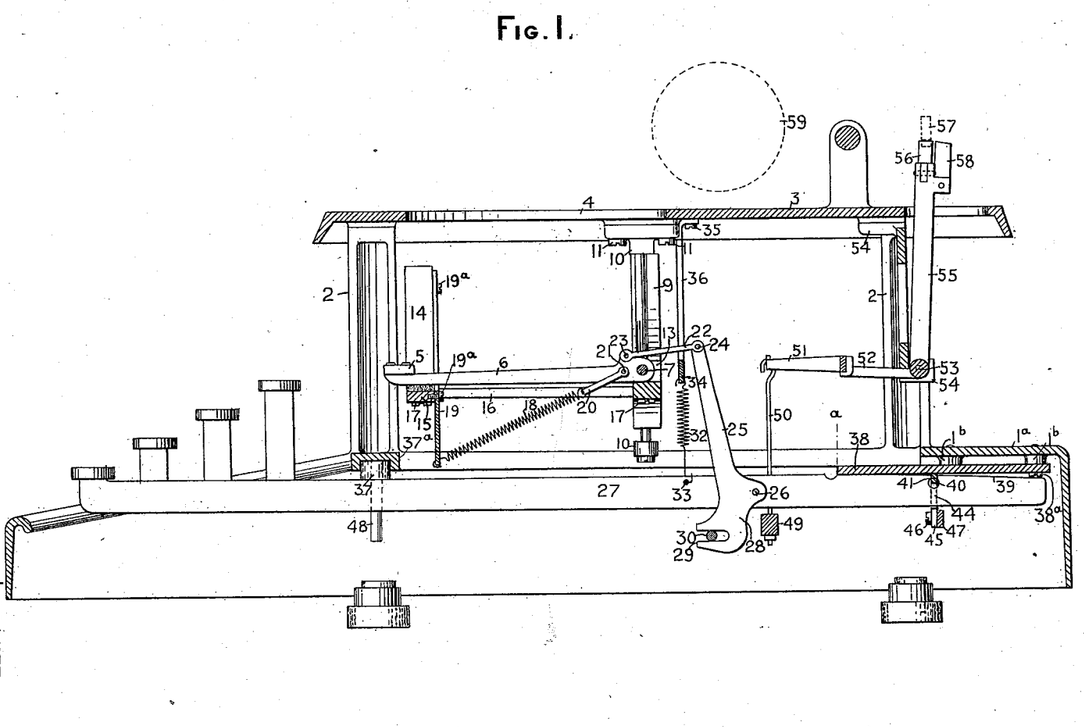
Figure 1 is a longitudinal sectional elevation of a "front-strike" type-writing machine invented by Jacob Felbel, to which my improvements are shown as adapted.
Figure 2:
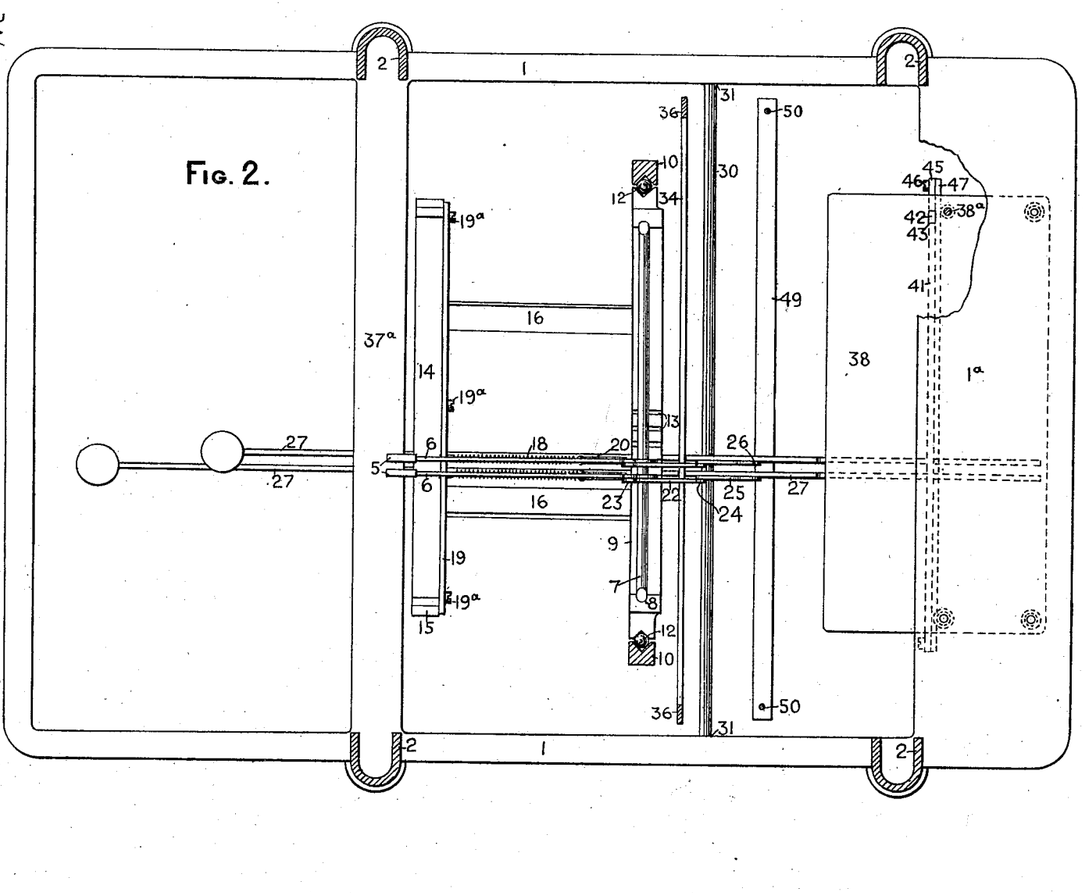
Fig. 2 is a sectional plan view of the machine shown at Fig. 1. In these and other figures certain parts are omitted for the sake of clearness.

Preferably no part of the lever-tread 39 is straight, so that it normally bears up against the plate 38 at only a single point, (indicated by the letter $a$ at Fig. 1.) This point is not far from the load-point 26 of the key-lever, and hence it will be observed that the movement of the type 5 is at the beginning comparatively slow. In other words, the type is given an easy start, and hence the resistance offered by the finger-key to the touch of the operator at the early part of the stroke is minimized. The key-lever works with a varying fulcrum, or, in other words, as the key-lever vibrates the tread 39 rocks or rolls along the extended fulcrum 38, and consequently the fulcrum-point constantly recedes from the load-point 26. As the type-bar gathers headway, the leverage or purchase of the key upon the type-bar constantly decreases, causing an acceleration of the speed of the type-bar as it approaches the platen, so that the type strikes a powerful blow. Owing to said decrease in leverage the resistance offered by the key to the operator's touch constantly increases from beginning to end of the key-stroke. Toward the latter end of the stroke the rear portion of the tread 39 is in working contact with the fulcrum-surface and the leverage is so much changed, and hence the resistance offered by the type-bar is so much increased as to gradually absorb the momentum of the hand, so that the final shock at the termination of the key-stroke is minimized.

Figures 3, 4, 5, 6:
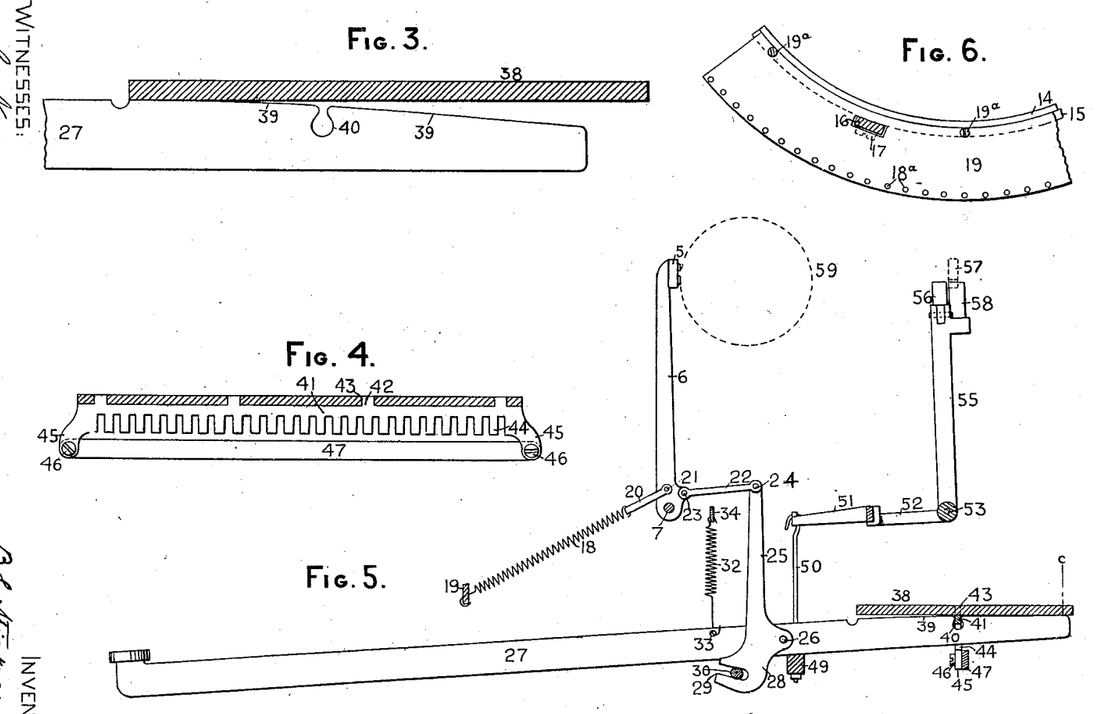
Fig. 3 is a fragmentary enlarged view of the rear end of a key-lever and a section of a fulcrum-plate.
Fig. 4 is a front elevation of the rear key-lever comb, the fulcrum-plate being shown in transverse section.
Fig. 5 is a skeleton view similar to Fig. 1, showing the parts at printing position.
Fig. 6 is a fragmentary elevation of the type-basket and a perforated plate attached thereto.
Figures 7, 8, 9:
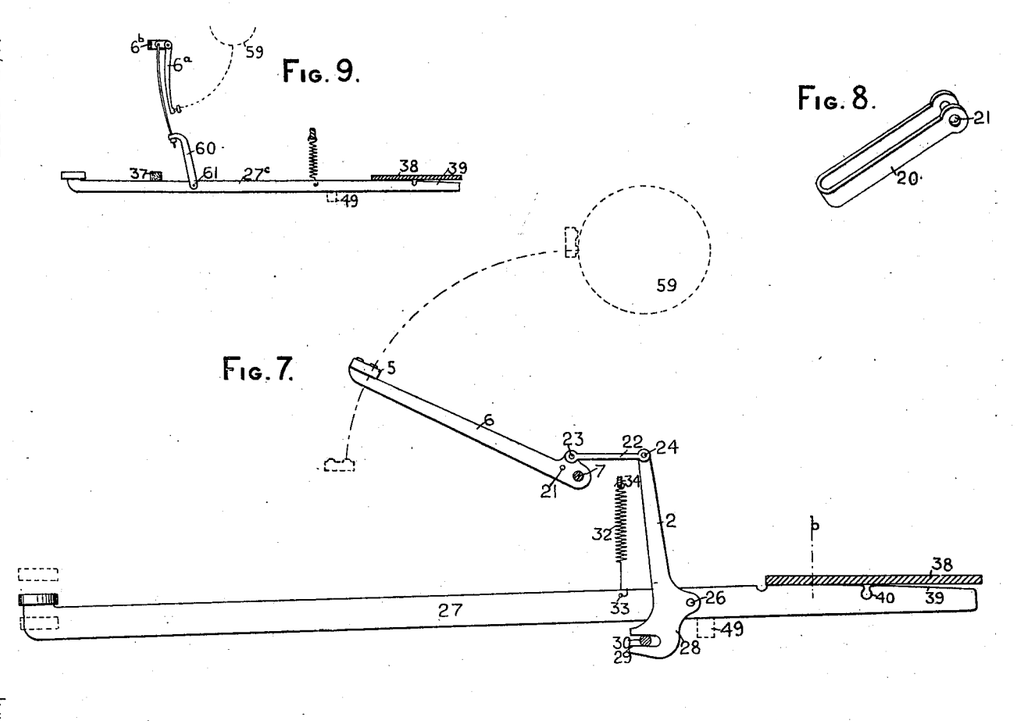
Fig. 7 is a view of a type action similar to that shown at Figs. 1 and 5, but showing the position of the parts when the key is half-way depressed.
Fig. 8 is a perspective view of a yoke for attachment to a type-bar.
Fig. 9 is a diagrammatic view illustrating my improvements as applied to an under-strike machine of the "Remington" class.

The tread or working edge 39 of the key-lever may, if desired, be cut upon an arc of a circle; but I obtain the best results by conforming the tread to a curve having a changing radius, the forward portion of the curve having the shorter and the rear portion of the curve having the longer radii, whereby as the key is depressed the fulcrum-point changes slowly at first, so that when the key has been depressed half-way, as illustrated at Fig. 7, the fulcrum-point has receded only a short distance, as indicated at $b$ at said figure, and the type-bar has moved only one-third or less of the distance from normal position to the platen. The remaining two-thirds or more of the type-bar movement is effected by the last half of the key-stroke, inasmuch as the recession of the fulcrum-point is more rapid during the latter half of the key-stroke. At the time of the impression of the type the rear extreme of the key-lever tread is bearing upon the fulcrum-plate at the point $c$, as shown at Fig. 5. If the curve 39 should be cut upon an arc of a circle, the fulcrum-point would change too soon, so that the desired cushioning effect at the beginning of the key-stroke is not fully obtained; but by the use of the described irregular curve the movement of the type is for the first third of its stroke rendered very gradual and the jar to the finger is avoided, while at the same time the subsequent quick change of the fulcrum-point gives an ample cushioning effect for absorbing the momentum of the hand and minimizing or forestalling the jar to the finger which occurs by reason of the impact of the type. The depth of the key depression may be the same as heretofore, the comparatively slow movement of the type at the beginning of the key-stroke being compensated by the comparatively slow movement of the key during the remainder of the stroke.

It will thus be seen that I have combined with a system or series of type-bars and a series of operating-keys a series of leverage-changing connections between said keys and said type-bars, each of said connections being constructed to diminish the leverage or purchase of its key upon its type-bar slowly during the first part of the key-stroke, so that the first portion of the impulse communicated from the key to the type-bar occurs when the leverage is greatest, and so that thereafter the leverage diminishes at first slowly, then more rapidly, until the point of least leverage is gained, at which point the last portion of the impulse is communicated from the key to the type-bar. It will also be observed in Fig. 7 that upon the release of the depressed key the type-bar completes two-thirds of its return motion by the time that its key has completed only one-half of its return motion—that is to say, assuming that the return movement of the finger-key is uniform the return of the type-bar is much more prompt than usual heretofore, and hence the succeeding type-bar may be operated sooner, thus permitting more rapid manipulation of the machine. Owing to the described change in leverage the spring 18, working through the link 22 and the bell-crank lever 25, exerts more tension upon the key at the beginning of the return stroke of the latter than at the finish thereof, so that the touch upon the keys is rendered very elastic. However, this spring may be omitted, if desired, and the spring 32 made correspondingly stronger. It will be observed that the spring 32 has a like effect to spring 18 in securing an elastic touch for the same reason.

Referring now to Fig. 9, it will be observed that the type-bars 6ª depend from hangers 6ᵇ and are connected by links 60 directly to the key-levers 27ᶜ and that the latter are provided with curved rocker portions or treads 39, which roll in the described manner along the under surface of the fulcrum-plate 38, so that as the key is depressed the fulcrum-point recedes from the load-point 61, where the link 60 is pivoted to the lever.

Figure 12:
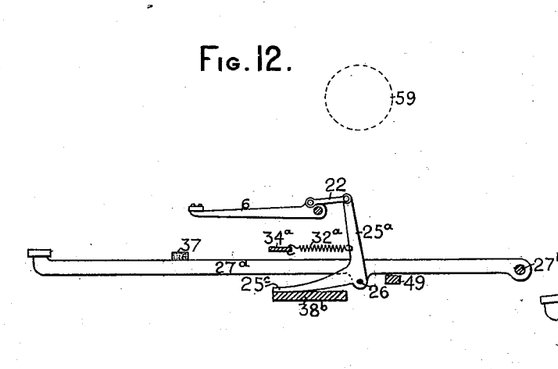
Fig. 12 is a view of a modification, showing a key-lever provided with a plain pivot and a bell-crank lever pivoted thereto and adapted to rock upon a fixed fulcrum-plate.
Figure 13:
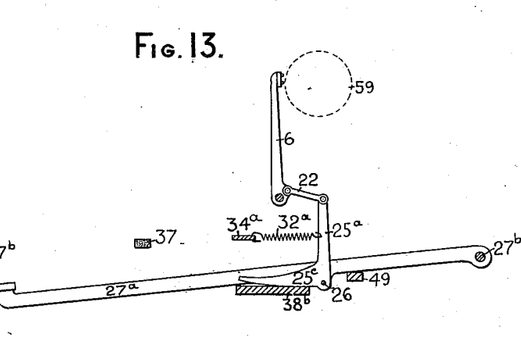
Fig. 13 is a view similar to Fig. 12, but showing the position of the parts when the type is swung to the platen.

While I have shown my improvements as preferably applied to a lever of the second order, I do not wish to be considered as limited thereto, as the invention may be carried out with other kinds of levers. So long as the lever operates a type-bar it is not essential that it be provided directly with a key or that it be in the form of a straight lever or that it be horizontally arranged. For instance, in the modification illustrated at Figs. 12 and 13 the key-levers 27ª are pivoted at their rear ends to a transverse cylindrical fulcrum-rod 27ᵇ. The bell-crank levers 25ª are pivoted to the key-levers at 26 and provided with treads, rockers, or creepers 25ᶜ, whose under edges roll or creep along the top surface of a transverse fulcrum-plate 38ᵇ, arranged beneath said rockers 25ᶜ. Normally the forward end of the rocker 25ᶜ bears upon the fulcrum-plate, and when the key-lever 27ª is depressed the tread of the rocker rolls or creeps backwardly along said fulcrum-plate, gradually decreasing the leverage of the key upon the type-carrier until the latter strikes the platen, as indicated at Fig. 13, at which time the rear portion of the tread is bearing upon the fulcrum-plate, and hence the leverage of the key is least. A horizontal returning-spring 32ª is hooked at its rear end to the vertical arm 25ª of the bell-crank lever and at its forward end to a transverse bar 34ª.

Figures 10, 11:
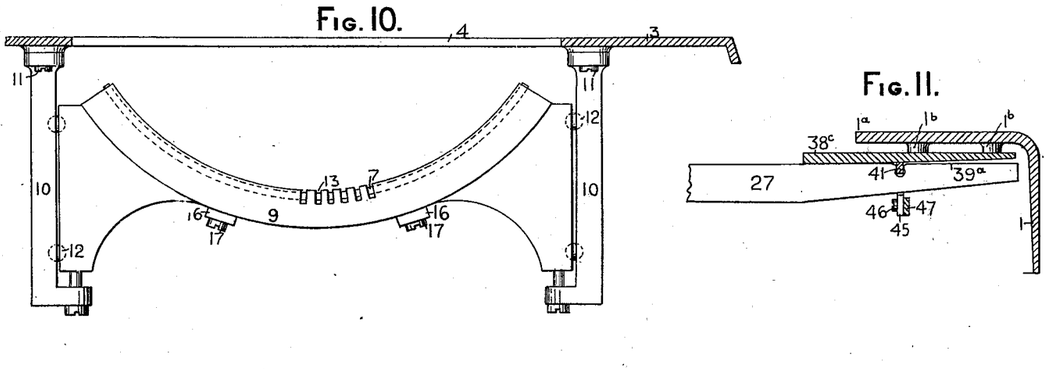
Fig. 10 is a rear elevation of a shiftable type-segment.
Fig. 11 is a fragmentary view of a modification, showing a key-lever provided with a straight tread and a fulcrum-plate having a curved working surface.

While I have shown a curved working edge 39 upon the lever, it is obvious that it is not essential that this edge be in the form of a continuous curve so long as the fulcrum-point is enabled to recede from the load-point. It is further obviously immaterial whether or not the edge 39 of the rocker be made straight and the plate 38 be given the required curve to enable the rocking effect to be produced, as this would be a mere reversal of the construction heretofore described. This modification is illustrated at Fig. 11, in which it will be observed that the tread 39ª of the key-lever is made straight and that the under surface 38ᶜ of the fulcrum-plate is curved, so that the lever rocks or creeps along said elongated fulcrum in the same manner and with the same effect as in the preferred construction.

Numerous other changes may be made in the construction and arrangement without departing from the spirit of my invention, which may be said to consist, broadly, in the provision of a shifting fulcrum for a type-bar-operating lever. The invention may be used also in machines of other designs and having other type-carriers than those illustrated, and parts of my improvements may be used without others.

What I claim as new, and desire to secure by Letters Patent, is as follows:

1. In a type-writing machine, the combination with a type-carrier of an operating-lever therefor, and means for causing the fulcrum-point of said lever to shift during the operation of the lever to move the type-carrier from normal position to the printing-point, so that the purchase of said lever upon said type-carrier is greatest at the beginning of the stroke and least at the end of the stroke.

2. In a type-writing machine, the combination with a type-carrier of an operating-lever therefor, and a fixed fulcrum-surface along which said lever is adapted to roll, so that the purchase of said lever upon said type-carrier diminishes during the operation of the lever.

3. In a type-writing machine, the combination with a type-carrier of an operating-lever therefor having a curved tread and a fixed straight fulcrum-surface along which said lever is adapted to roll, so that the purchase of said lever upon said type-carrier diminishes during the operation of the lever.

4. In a type-writing machine, the combination of a type-carrier, a lever, connecting devices extending from said type-carrier to said lever at a point between its ends, operating means at one end of said lever, and a fixed fulcrum-surface along which the other end of the lever has a leverage-changing rolling movement.

5. In a type-writing machine, the combination of a type-carrier, a lever provided at one end with a key, a fixed fulcrum-surface arranged over the other end of the lever and along which the upper edge of the lever has a leverage-changing rolling movement, and connecting devices extending from a point between the ends of said lever to said type-carrier.

6. In a type-writing machine, the combination with a series of type-bars of a series of operating-levers therefor and a common fulcrum-plate along which all of said levers have leverage-changing rolling movements.

7. In a type-writing machine, the combination with a series of type-bars of a series of operating-levers therefor each having a curved tread, and a fixed plane fulcrum-plate along which all of said levers have leverage-changing rolling movements.

8. In a type-writing machine, the combination of a series of type-bars, a series of levers provided at their forward ends with keys, a fixed common fulcrum-plate arranged over the rear ends of the levers and along the under surface of which said levers have leverage-changing rolling movements, and a series of connecting devices extending from said levers to said type-bars.

9. In a type-writing machine, the combination of a type-carrier, a key-lever, a sublever connected to said key-lever and also to said type-carrier, and means for causing one of said key-lever and sublever elements to work with a varying fulcrum, so that the purchase of the key upon the type-carrier is greatest at the beginning of the stroke and least at the end of the stroke.

10. In a type-writing machine, the combination of a series of type-bars, a series of levers of the second order provided at their forward ends with keys, a sublever pivoted upon each of said key-levers and provided with a connection to the corresponding type-bar, and means for causing one of said key-lever and sublever elements to work with a varying fulcrum, so that the purchase of the key upon the type-bar is greatest at the beginning of the stroke and least at the end of the stroke.

11. In a type-writing machine, the combination of a series of type-bars, a series of levers, each provided with a key at its forward end, a common fulcrum-plate arranged over the rear ends of said levers and along the under surface of which said levers have leverage-changing rolling movements, and a sublever pivoted to each of said levers and connected to the corresponding type-bar.

12. In a type-writing machine, the combination with a type-carrier of an operating-lever therefor, a fixed fulcrum-surface along which said lever has a leverage-changing rolling movement, such that the purchase of said lever upon said type-carrier diminishes during the operation of the lever, and means for preventing endwise displacement of the lever.

13. In a type-writing machine, the combination with a type-carrier of an operating-lever therefor, a fixed fulcrum-surface along which said lever is adapted to roll, a fixed projection, and a notch formed in said lever and adapted to engage said projection.

14. In a type-writing machine, the combination with a series of type-bars of a series of operating-levers therefor, a common fulcrum-plate upon which said levers are adapted to roll, a fixed bar common to all of said levers, and a notch formed in each of said levers and adapted to engage said bar.

15. In a type-writing machine, the combination with a series of type-bars, of a series of operating-levers therefor, provided with curved treads, a plate along which said levers are adapted to roll, a bar secured to said plate and extending transversely of said levers, and a notch formed in each lever and adapted to engage said bar.

16. In a type-writing machine, the combination with a series of type-bars, of a series of operating-levers therefor, a common fulcrum-plate along which all of said levers have leverage-changing rolling movements, a transverse bar secured to said fulcrum-plate, and a series of teeth formed integrally with said bar and adapted to space said levers apart.

17. In a type-writing machine, the combination with a type-carrier of an operating-lever therefor, a fixed fulcrum-surface along which said lever is adapted to roll, a fixed projection, a notch formed in said lever and adapted to engage said projection, and means for preventing accidental disengagement of said notch from said projection.

18. In a type-writing machine, the combination with a series of type-bars, of a series of operating-levers therefor, a fulcrum-plate along which said levers are adapted to roll, a bar secured transversely upon said fulcrum-plate, a notch formed in each lever and adapted to engage said bar, and a second bar common to all of said levers and adapted to prevent accidental disengagement of the notches from the first-mentioned bar.

19. In a type-writing machine, the combination with a series of type-bars, of a series of key-levers therefor, a fulcrum-plate arranged over the rear ends of the levers, a bar secured transversely along the under surface of said fulcrum-plate, a series of teeth formed integrally with said bar and adapted to space said levers apart, a pair of arms provided upon said bar, and a second transverse bar secured to said arms beneath said levers, and adapted to prevent accidental disengagement of said notches from the first-mentioned bar.

20. In a type-writing machine, the combination with a type-carrier of an operating-lever therefor, a fixed fulcrum-surface along which said lever is adapted to roll, a fixed projection, means provided upon said lever to engage said projection so as to prevent endwise movement thereof, and removable means for preventing said lever from becoming accidentally disengaged from said projection.

21. In a type-writing machine, the combination with a type-carrier, of an operating-lever therefor, a fixed fulcrum-surface along which said lever is adapted to roll, and a spring for holding said lever against said fulcrum-surface.

22. In a type-writing machine, the combination with a series of type-bars, of a series of operating-levers therefor, a common fulcrum-plate along which said levers are adapted to roll, and a series of springs for holding said levers against said fulcrum-plate.

23. In a type-writing machine, the combination with a series of type-bars, of a series of levers having keys at their forward ends, a stop for the forward ends of said levers, a fulcrum-plate arranged over the rear ends of said levers, and along the under surface of which said levers are adapted to roll, a connection extending from each type-bar to the associated key-lever at a point between said fulcrum-plate and said stop, and a spring attached to each of said key-levers between said connection and said stop.

24. In a type-writing machine, the combination with a type-carrier of an operating-lever therefor, and means for causing the fulcrum-point of said lever to shift slowly during the first part of the operation of the lever, and rapidly during the latter part of the operation of the lever to move the type-carrier from normal position to the printing-point, so that the purchase of said lever upon said type-carrier diminishes slowly during the first portion of the stroke and rapidly during the remainder of the stroke.

25. In a type-writing machine, the combination with a type-carrier and an operating-key of an intermediate irregularly-curved rolling device, whereby at the operation of said key, the purchase of said key upon said type-carrier diminishes slowly during the first part of the key-stroke and rapidly during the remainder of the key-stroke.

26. In a type-writing machine, the combination with a type-carrier, of an unpivoted key-lever connected thereto and having a free elongated fulcrum end, and an elongated fulcrum for said free end of the key-lever.

27. In a type-writing machine, the combination with a type-carrier, of an operating-lever free at its fulcrum end, and an extended or elongated fulcrum therefor, whereby when the said lever is vibrated the fulcrum end may creep along the fulcrum or contact therewith at successive points, so as to change the leverage.

28. In a front-strike type-writing machine, the combination of a series of type-bars pivoted at their rear ends, a link pivoted to each type-bar, a lever to which the other end of said link is pivoted, an unpivoted key-lever to which said lever is pivoted, and an extended fulcrum for said key-lever.

29. In a front-strike type-writing machine, the combination of a series of type-bars pivoted at their rear ends and each carrying a plurality of types, means for shifting said type-bars vertically to enable one or the other of said types to print, a link pivoted to each type-bar, a lever to which the other end of said link is pivoted, an unpivoted key-lever to which said lever is pivoted, and an extended fulcrum for said key-lever.

30. In a front-strike type-writing machine, the combination of a series of type-bars pivoted at their rear ends, a horizontally-arranged link pivoted to each type-bar, a bell-crank lever to which the other end of said link is pivoted, an unpivoted horizontally-arranged key-lever to which said bell-crank lever is pivoted, a horizontal fulcrum-plate arranged over the rear ends of said key-levers and along the under surface of which said key-levers are adapted to roll, and a common fulcrum-rod for said bell-crank levers.

31. In a front-strike type-writing machine, the combination of a series of type-bars pivoted at their rear ends, a horizontally-arranged link pivoted to each type-bar, a bell-crank lever to which the other end of said link is pivoted, an unpivoted horizontally-arranged key-lever to which said bell-crank lever is pivoted, a horizontal fulcrum-plate arranged over the rear ends of said key-levers and along the under surface of which said key-levers are adapted to roll, springs for holding said key-levers up against said fulcrum-plate, and a common fulcrum-rod for said bell-crank levers.

32. In a front-strike type-writing machine, the combination of a series of type-bars pivoted at their rear ends, a spring device connected at one end to said type-bar and at the other end to a fixed part of the machine, a horizontally-arranged link pivoted to each type-bar, a bell-crank lever to which the other end of said link is pivoted, an unpivoted horizontally-arranged key-lever to which said bell-crank lever is pivoted, a horizontal fulcrum-plate arranged over the rear ends of said key-levers and along the under surface of which said key-levers are adapted to roll, and a common fulcrum-rod for said bell-crank levers.

33. In a type-writing machine, the combination with a platen of a system of type-bars having a plurality of sets of characters thereon, a system of key-operated levers, means for causing the fulcrum-point of each of said levers to shift during the operation of the lever to move its type-bar from normal position to the printing-point, and means for shifting said type-bar system relatively to said key-lever system and to said platen, to cause different sets of characters to print.

34. In a type-writing machine, the combination with a platen of a system of type-bars having a plurality of sets of characters thereon, a system of levers each bearing a finger-key, means for causing the fulcrum-point of each of said key-levers to shift during the operation of the lever to move its type-bar from normal position to the printing-point, connections extending from said key-lever system to said type-bar system, and means for shifting said type-bar system relatively to said key-lever system and to said platen, to cause different sets of characters to print.

35. In a type-writing machine, the combination with a series of type-bars and a series of operating-keys of a series of leverage-changing connections between said keys and said type-bars, each of said connections being constructed to diminish the leverage of its key upon its type-bar slowly during the first part of the key-stroke, and rapidly during the remainder of the key-stroke, so that the first portion of the impulse communicated from the key to the type-bar occurs when the leverage is greatest, and so that thereafter the leverage diminishes at first slowly, then more rapidly, until the point of least leverage is gained, at which point the last portion of the impulse is communicated from the key to the type-bar.

Signed at the borough of Manhattan, city of New York, in the county of New York and State of New York, this 11th day of January, A. D. 1900.

BURNHAM C. STICKNEY.

Witnesses:
PAUL ARMITAGE,
ETHEL WELLS.